US008374912B2

(12) United States Patent  (10) Patent No.: US 8,374,912 B2
Paroz et al.  (45) Date of Patent: Feb. 12, 2013

(54) SYSTEM AND METHOD FOR MANAGING AND OPTIMIZING ADVERTISING CAMPAIGNS MANAGED ON THE INTERNET

(75) Inventors: Sandrine Paroz, Saint-Lambert (CA); Richard Couture, Saint-Lambert (CA); Martin Mailloux, Saint-Lambert (CA); Martin LeSauteur, Saint-Lambert (CA); Marc Poirier, Saint-Lambert (CA); Benoit Allaire, Saint-Lambert (CA)

(73) Assignee: Acquisio Inc., Brossard (CA)

( * ) Notice: Subject to any disclaimer, the term of this patent is extended or adjusted under 35 U.S.C. 154(b) by 197 days.

(21) Appl. No.: 12/750,352

(22) Filed: Mar. 30, 2010

(65) Prior Publication Data

US 2011/0125590 A1  May 26, 2011

(30) Foreign Application Priority Data

Mar. 30, 2009 (CA) .................................. 2659538

(51) Int. Cl.
*G06Q 30/00* (2012.01)
(52) U.S. Cl. .................................................. 705/14.1
(58) Field of Classification Search ................. 705/14.1
See application file for complete search history.

(56) References Cited

U.S. PATENT DOCUMENTS

2009/0299998 A1* 12/2009 Kim ................................. 707/5

OTHER PUBLICATIONS

Kitts, B., Laxminarayan, P., LeBlanc, B., Meech, R. (2005). A Formal Analysis of Search Auctions Including Predictions on Click Fraud and Bidding Tactics. In: Workshop on Sponsored Search Auctions.

Liu, D., Chen, J Whinston, A.B. (2006). Keyword Auctions as Weighted Unit-Price Auctions.
Mehta, A., Goel, G. (2007). Adwords Auctions with Decreasing Valuation Bids. Lecture Notes in Computer Science 4858/2007:335-340.
Muthukrishnan, S., Martin, P., Zoya, S. (2007). Stochastic models for budget optimization in search-based advertising. In: WINE'07: Proceedings of the 3rd international conference on Internet and network economics, p. 131-142.
Muthukrishnan, S. (2008). Internet Ad Auctions: Insights and Directions. In: ICALP '08: Proceedings of the 35th international colloquium on Automata, Languages and Programming, Part I, Edition (Springer-Verlag, ed), p. 14-23.
Naldi, M., D'Acquisto, G., Italiano, G.F. (2010). The value of location in keyword auctions. Electronic Commerce Research and Applications 9:160-170.
Nisan, N., Roughgarden, T., Tardis, É., Vazirani, V.V. (2007). Algorithmic Game Theory, Edition. Cambridge University Press.

(Continued)

*Primary Examiner* — Daniel Lastra
(74) *Attorney, Agent, or Firm* — Brouillette & Partners; François Cartier; Robert Brouillette

(57) ABSTRACT

The system of the present invention is used to optimize the returns of advertising campaigns on the internet. The system allows to create portfolios of keywords and to optimize these portfolios. Moreover, the system allows to classify the keywords in the portfolios according to their past data and to agitate the keywords which held a stagnant position over a pre-set period of time.

The system support different implementations of the keyword classification in portfolios, different implementations of keyword bids agitation and different implementations of optimization. The various implementations can meet the specific aspects of different industries and/or the distinctive optimization approach of different agencies.

The system can leverage the cloud computing whereby shared data, process and information are provided to computers and other devices on-demand. The delivery model involves the provision of dynamically scalable and virtualized resources as a service over the Internet. Some or all of the system components can be executed in the cloud through an on-demand instantiation of the resources required to perform the task.

25 Claims, 9 Drawing Sheets

OTHER PUBLICATIONS

Richardson, M., Dominowska, E., Ragno, R. (2007). Predicting clicks: estimating the click-through rate for new ads. In: WWW '07: Proceedings of the 16th international conference on World Wide Web, p. 521-530. ACM.

Rusmevichientong, P. Williamson, D.P. (2006). An adaptive algorithm for selecting profitable keywords for search-based advertising services. In: EC '06: Proceedings of the 7th ACM conference on Electronic commerce, p. 260-269. ACM.

Searchignite, Keyword Portfolio Optimization for Pay-per-Click Search Engine Marketing. Searchiginite Whitepaper.

Agichtein, E., (2006). Learning user interaction models for predicting web search result preferences. In: SIGIR '06: Proceedings of the 29th annual international ACM SIGIR conference p. 3-10. ACM.

Bhat, S. Church, K (2008). Variable selection for ad prediction. In: ADKDD '08: Proceedings of the 2nd International Workshop on Data Mining and Audience Intelligence for Advertising, p. 45-49. ACM.

Borgs, C., (2007). Dynamics of bid optimization in online advertisement auctions. In: WWW '07: Proceedings of the 16th international conference on World Wide Web, p. 531-540. ACM.

Cary, M., Das, A, Edelman, B., Giotis, I., Heimerl, K., Karlin, A.R., Mathieu, C., Schwarz, M., (2008). On Best-Response Bidding in GSP Auctions.

Doyle, P. Saunders, J. (1990). Multiproduct advertising budgeting. Marketing Science 9 (2):97-113.

Edelman, B. Ostrovsky, M. (2007). Strategic bidder behavior in sponsored search auctions. Decis. Support Syst. 43:192-198.

Edelman, B., Ostrovsky, M., Schwarz, M .(2005). Internet Advertising and the Generalized Second Price Auction: Selling Billions of Dollars Worth of Keywords.

EfficientFrontier (2007). The Algorithmic Solution for Search Marketing Optimization. An Efficient Frontier White Paper.

EfficientFrontier (2008). The Science of Search Success. An Efficient Frontier Opinion Paper.

EfficientFrontier (2008). Marketers vs. mathematicians. An Efficient Frontier Opinion Paper.

EfficientFrontier (2008). Algorithms and Optimization. An Efficient Frontier White Paper.

Fain, D.C. Pedersen, J.O. (2006). Sponsored Search: a Brief History. Bulletin of the American Society for Information Science and Technology 32:12-13.

Feldman, J., Muthukrishnan, S., Pal, M. Stein, C (2007). Budget optimization in search-based advertising auctions. In: EC '07: Proceedings of the 8th ACM conference on Electronic commerce, p. 40-49. ACM.

Fruchter, G.E., Dou, W. (2005). Optimal Budget Allocation over Time for Keyword Ads in Web Portals. Journal of Optimization Theory and Applications 124(1):157-174.

Hou, L., Wang, L., Yang, J. (2008). Evolutionary Prediction of Online Keywords Bidding. In: EC-Web '08: Proceedings of the 9th international conference on E-Commerce and Web Technologies, p. 124-133. Springer-Verlag.

Jansen, J. Mullen, T. (2008). Sponsored search: an overview of the concept, history, and technology. International Journal of Electronic Business 6:114-131.

Joachims T., (2005). Accurately interpreting clickthrough data as implicit feedback. In: SIGIR '05: Proceedings of the 28th annual international ACM SIGIR conference, p. 154-161. ACM.

Kelly, T. (2004). Combinatorial Auctions and Knapsack Problems. In: AAMAS '04: Proceedings of the Third International Joint Conference on Autonomous Agents and Multiagent Systems, p. 1280-1281. IEEE Computer Society.

Kitts, B., LeBlanc, B. (2004). Optimal Bidding on Keyword Auctions. Electronic Markets 14:186-201.

Kitts, B., LeBlanc, B.J. (2004). A Trading Agent and Simulator for Keyword Auctions. In: AAMAS'04: Proceedings of the Third International Joint Conference on Autonomous Agents and Multiagent Systems, p. 228-235. IEEE Computer Society.

Varian, H.R. (2007). Position Auctions. International Journal of Industrial Organization 25 (6):1163-1178.

Varian, H.R. (2009). Online Ad Auctions. AER Papers and Proceedings 99(2):430-434.

Wang, X., Broder, A. (2009). A Search-based Method for Forecasting Ad Impression in Contextual Advertising. In: WWW '09: Proceedings of the 18th international conference on World wide web, p. 491-500. ACM.

Wang, X., Broder, A., Fontoura, M., Josifovski, V. (2009) .A search-based method for forecasting ad impression in contextual advertising. In: WWW '09: Proceedings of the 18th international conference on World wide web, p. 491-500. ACM.

Wu, G. Kitts, B. (2008). Experimental comparison of scalable online ad serving. In: KDD '08: Proceeding of the 14th ACM SIGKDD international conference on Knowledge discovery and data mining, p. 1008-1015. ACM.

Zhou, Y., Chakrabarty, D., Lukose, R. (2008). Budget constrained bidding in keyword auctions and online knapsack problems. In: WWW '08: Proceeding of the 17th international conference on World Wide Web, p. 1243-1244. ACM.

* cited by examiner

SYSTEM AND METHOD FOR MANAGING AND OPTIMIZING ADVERTISING CAMPAIGNS MANAGED ON THE INTERNET

CROSS-REFERENCE TO RELATED APPLICATIONS

The present patent application claims the benefits of priority of Canadian Patent Application no. 2,659,538, entitled "System and method for managing and optimizing advertising networks" and filed at the Canadian Patent Office on Mar. 30, 2009.

FIELD OF THE INVENTION

The invention relates generally to systems and methods for managing advertising networks.

BACKGROUND OF THE INVENTION

For advertisers running and managing PPC marketing campaigns, it would be beneficial to have a tool which can automatically determine bids and optimize campaigns globally within a certain budget. For a tool to do so, it would need to make predictions based on historical data of the keywords it is attempting to optimize.

It is difficult to form any predictions about keywords which have held a stagnant position on a search engine over a period of time. Moreover, when new campaigns are created, or when new keywords are added to existing campaigns, they lack the historical data required to make any predictions about them. In such instances, it would be useful to have a tool that can automatically change the positions of those keywords during a predetermined time period, all while optimizing the management of the budget.

OBJECTIVE OF THE INVENTION

The objective of the invention is to provide the following automated tools:
1. An optimization tool that can automatically set an optimal bidding strategy for predetermined portfolios of keywords
2. An agitation tool that automatically changes the positions of words on search engines over a predetermined period of time.

SUMMARY OF THE INVENTION

The present invention allows for the global optimization and agitation of a portfolio of keywords for which insufficient historical data exists to make predictions about them.

The system of the present invention allows
The creation of portfolios of keywords across different campaigns and different search engines;
The predictions and production of prediction curves for keywords (individual predictions for some keywords, global predictions for others);
The classification of keywords based on their historical performances;
The agitation of keywords which are either new, have insufficient historical data, or have not visited enough different positions over a period of time.
Features of the System
Automatic tools;
Ability to be combined with Bid Rules Management;
Visualization tools for predictions.

Benefits of the System
Saving time on day-to-day optimization using the automatic optimization and agitation tools;
Saving time when creating new campaigns with the automatic agitation tool;
Optimizing with a global goal for portfolios of keywords.
What Users Can Do
Choose the keywords comprising the portfolio;
Get a visualization for the prediction curves used;
Set their objectives for optimization (clicks, conversions, ROAS, etc.);
Set their constraints for optimization (maximum cost per acquisition, budget, etc.);
Set their constraints for the agitation tool (minimum or maximum duration, degrees of risk, precision of predictions, etc.);
Setting keyword cycle to daily, monthly, yearly, etc.
Portfolio Creation and Optimization The system allows users to create portfolios of keywords from different PPC campaigns and search engines, giving them the advantage to create very specific portfolios. The optimization is performed per portfolio of keywords. If the user chooses or puts together two or more portfolios, each will be optimized separately. Users must set a separate budget for the optimization of each portfolio. Users can specify the cycle which keywords follow, being daily, monthly or yearly. The cycle is set as daily by default.

Once the portfolios are created, the system will optimize the bids of the keywords by classifying them into different categories, based on specific criteria. This process occurs through a classification tree.

The classification tree is comprised of several steps, which analyze the number and quality of the historical data of keywords. Each keyword goes through the classification tree every day. If the historical data analysis of a keyword is satisfactory, it becomes qualified for predictions to be performed on it.

These predictions are
Average CPC according to the positions on search engines;
Max CPC according to the positions on search engines;
Clicks according to the positions on search engines;
conversions according to the positions of the search engines;
impressions according to the positions of the search engines;
revenue according to the positions of the search engines;
ROAS according to the positions of the search engines;
clicks according to average or max CPC;
conversions according to average or max CPC;
revenue according to average or max CPC;
ROAS according to average or max CPC.

Once the prediction curves are created, their regression is calculated to determine the accuracy of the prediction. Depending on the outcome of the prediction, a keyword either goes directly into the optimization or agitation tools.

The optimization is performed with a global objective and takes place under predefined constraints. Users can set their objectives, constraints, and total allocated budget. At this stage, users are also able to include different budgets for optimization according to search engines.
Automatic Agitation Tool As keywords pass through the classification tree, some may end up in the agitation tool. This tool has two main goals. The first is to force keywords to visit several different positions on search engines, hence, the "agitation". This is to allow gathering enough data to make more accurate predictions. The second goal is to agitate new keywords in order to perform the first predictions about them.

Users have control over settings such as minimum and maximum duration of the agitation, minimum quality criteria for the prediction curves to reach before to stop the agitation, minimum and maximum budget allowed for the agitation, keywords forced to be agitated, keywords held from being agitated.

Those automatic optimization and agitation tools aim for the least amount of daily interventions by users while providing them with the best returns for their campaigns.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

Novel tools to automatically manage and optimize internet marketing campaigns will be described hereinafter. Although the invention is described in terms of specific illustrative embodiment(s), it is to be understood that the embodiment(s) described herein are by way of example only and that the scope of the invention is not intended to be limited thereby.

Portfolio of Keywords

The following represents an optimization module for a portfolio of keywords (multi search engines). This module can also optimally manage the budgets of each search engine individually.

Each portfolio of keywords can be created with keywords from several campaigns and on different search engines. The keywords of a portfolio are divided in four main groups:

1. Keywords having a satisfying history of data, and for which performed predictions verify some economical hypotheses and some adjustment criteria of the curves ($R^2$ and p-value). These keywords constitute the first group of the optimized keywords.
2. Keywords without a satisfactory history of data (i.e. either having very few historical data, or having very few or no clicks). For these keywords, a global prediction model must be built. Some of these keywords can also be managed by Bid Rules in the Campaign Automation.
3. Keywords that must be agitated. The reasons for which a keyword must be agitated are: because they have no history or because their historical data does not meet certain criteria.
4. Keywords which are suggested to be paused or suppressed (not enough data in the time period of reference and poor Quality Score or ClickThruRate). Users can decide whether they want to pause, suppress or keep them. If kept, they are predicted globally (with the keywords of the second group) and optimized.

Figure 1:
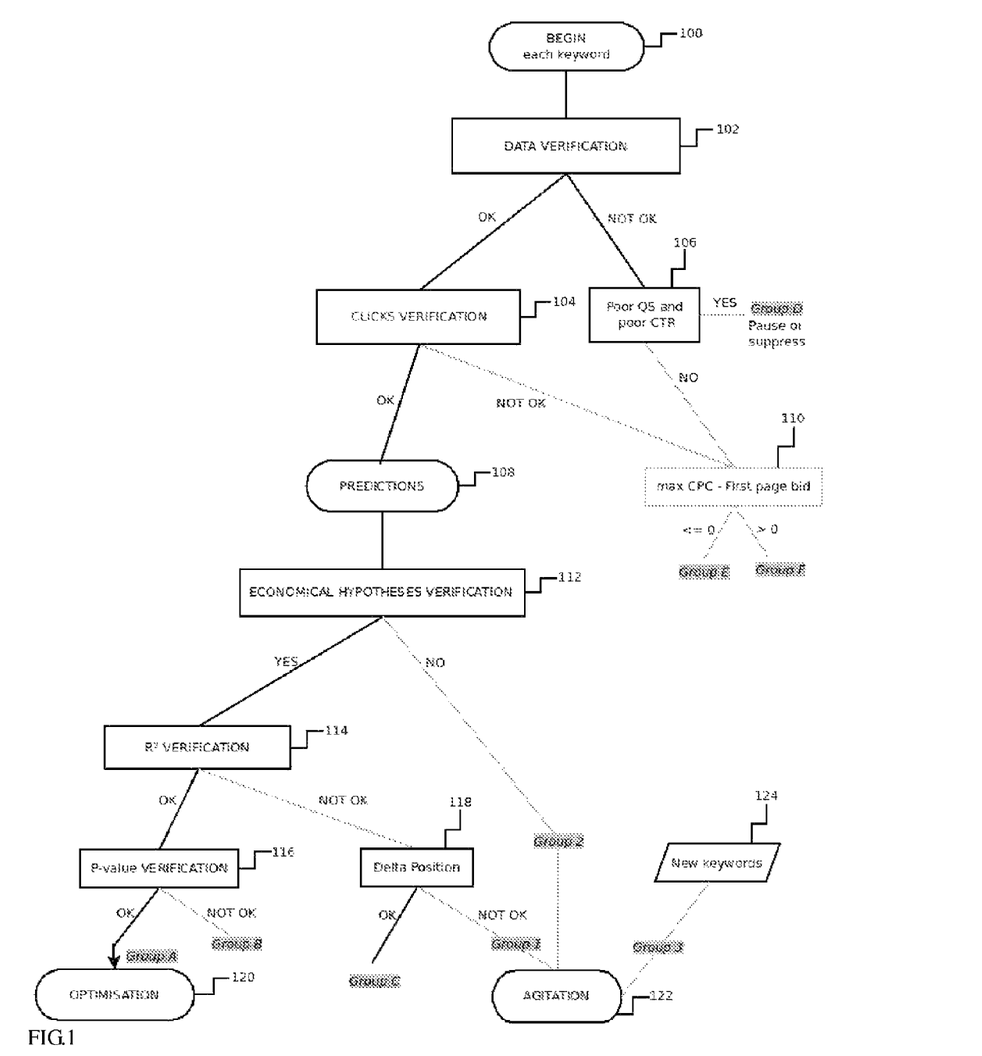
FIG. 1 is the representation of the classification tree. A detailed description of the classification tree is given in the section "Detailed Description of the Preferred Embodiment".

A classification tree has been elaborated to determine which category a keyword qualifies for. The classification tree is presented in FIG. 1. This classification tree is comprised of several steps (each keyword goes through the classification tree, step 100 of FIG. 1). For example, these steps can be:

Firstly, the classification tree verifies whether or not each keyword has enough historical data in the last x days (step 102 of FIG. 1). For example, it can check if each keyword has at least 20 days of historical data in the last 50 days.

The second verification ensures that for all keywords passing through step 1, the sum of the clicks obtained in the last x days is superior or equal to a defined value (step 104 of FIG. 1).

For the keywords passing through the first two steps, some predictions are performed (positions-clicks, positions-CPC). This is done in step 108 of FIG. 1. The predictions are performed using linear and exponential regressions.

The fourth check verifies whether or not these predictions make sense (economically). In FIG. 1 this is done in step 112.

For example, the system can carry out the following verifications.

The system checks if the number of predicted clicks in position 1 is more than 0.

The system verifies that the obtained position for a CPC of $0 is more or equal to 1 (the smallest position is 1).

The system verifies that the derivative of the curves positions-clicks or positions-conversions is smallest than 0.

Finally, the system also verifies that the derivative of the curves positions-maxCPC or positions-averageCPC is smaller than 0.

Keywords satisfying the economical hypotheses go to the fifth verification (step 114 of FIG. 1), in which the determination coefficient ($R^2$) is verified for the different prediction curves.

For keywords succeeding this fifth verification, the p-value of the two regressions is verified (step 116 of FIG. 1). Generally the keywords succeeding the $R^2$ test also succeed this test.

Keywords which go through all these six verifications are directly optimized by the Optimization tool—step 120 of FIG. 1 (because the predictions can be done separately for each keyword). Keywords which fail these verifications are grouped in different groups (three mainly). One of these keywords groups is sent to the agitator (step 122 of FIG. 1), another group of keywords goes through global predictions because each keyword doesn't have enough usable data, and the third group of keywords the system proposes to pause or suppress these them. It is sometimes possible to have a fourth group managed by bid rules.

The step 106 of FIG. 1 verifies the quality score and the click-thru-rate of the keywords which have insufficient data. If the quality score and the click-thru-rate are poor the system proposes to pause or suppress them.

The step 110 of FIG. 1 verifies if the difference of the max CPC and the first page bid is below or more than zero.

The step 118 of FIG. 1 verifies if the keyword has visited a sufficient delta of positions during the period of reference.

The step 120 of FIG. 1 is the automatic portfolio optimization.

The step 122 of FIG. 1 is the automatic agitation tool.

The step 124 of FIG. 1 represents the new keywords (which are sent to the agitation tool).

Predictions

As previously mentioned, some predictions are done for keywords which enough clicks, (step 108 of FIG. 1.).

For these keywords, the future predictions are done using linear or exponential regressions on historical data to predict clicks and CPC according to their position. Moreover, depending on the objectives and constraints set or placed by users, other predictions such as conversions based on position can be done as well. Existing Java libraries are used to create these regressions. Before calculating the regression, the clicks of the history are plotted according to the mean impressions by day of the week with the goal of normalizing the points to create equal week days: $clicks_i = clicks_i * impperc_{day}/14.286$, where i is the keyword. The outliers are removed using the Cook's distance.

Figure 2:
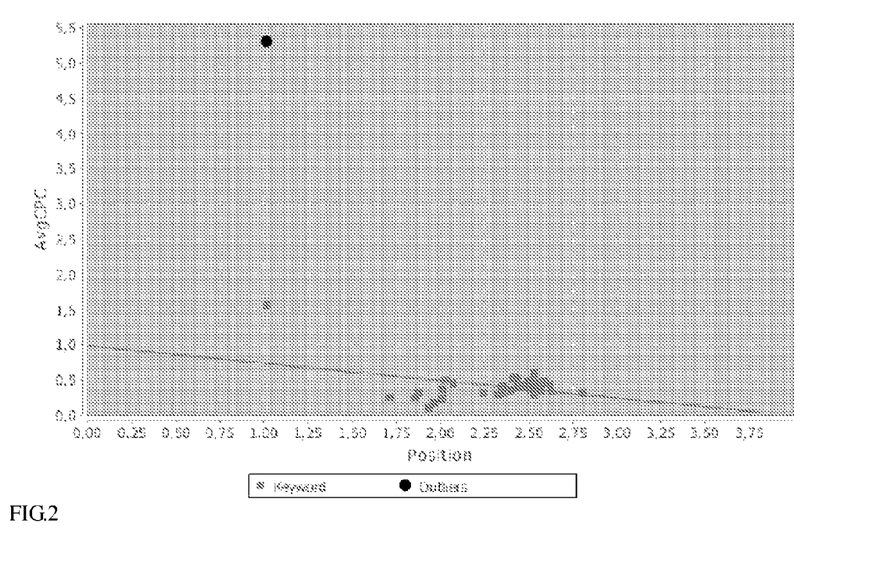
FIG. 2 is an example of a prediction line for keyword with the suppression of an outlier (for the prediction curve "average CPC according to positions" using a linear regression). The past data kept are the squares, the outlier is the circle and the prediction line is presented.

The figure FIG. 2 represents a prediction model done with a linear regression and for which an outlier has been removed.

Figure 3:
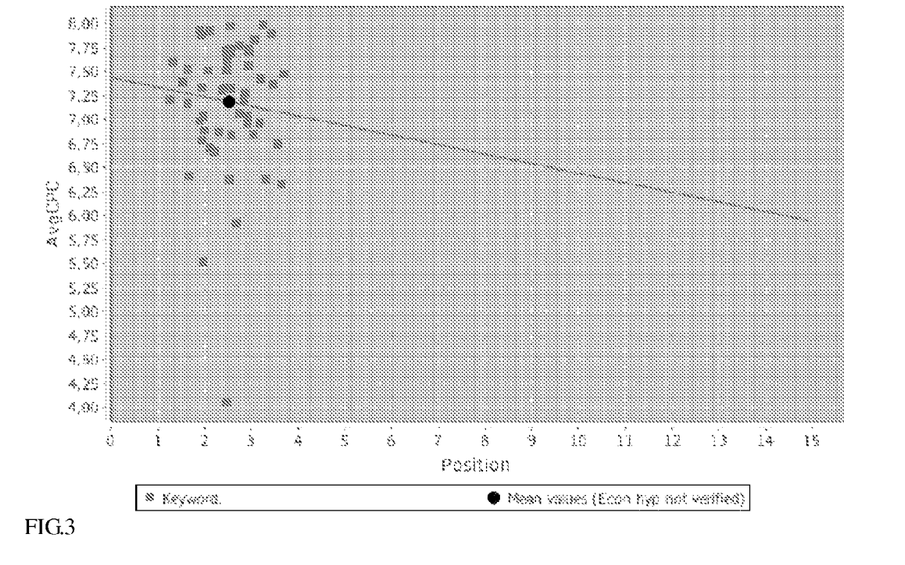
FIG. 3 is an example of a prediction line for a keyword which doesn't verify the economical hypotheses (for the prediction "average CPC according to positions", using a linear regression). The past data are the squares, the "mean position-mean average CPC" is the circle and the prediction line is presented.

When neither the linear regression or the exponential regression satisfy the economical hypotheses for a certain keyword, then the predictions used by the agitation are done by calculating a mean point and using a predetermined slope. FIG. 3 represents an example of a keyword having this sort of behavior.

Automatic Bid Agitation

Keywords classified to go through the agitator are divided into 3 groups (step 122 of FIG. 1):

Keywords whose predictions satisfy the economical hypotheses, but don't satisfy the $R^2$ criteria and having a positions differential smaller than a determined value (group named Group 1 in FIG. 1).

Keywords whose predictions don't satisfy the economical hypotheses (group named Group 2 in FIG. 1);

New keywords having no historical data (Group 3 in FIG. 1);

The agitation tool is formed by an algorithm which is executed on a daily basis; this algorithm needs the resolution of a linear program.

The notations needed to understand the algorithm and the linear program are presented in the next section. The daily algorithm and the idea behind the model for the agitation are presented in the section following that.

Notations

Here are some used notations:

$L_i$: lower bound on the position on the cloud of points.
$U_i$: upper bound on the position on the cloud of points.
n: number of agitated keywords.
i: index of the keyword
p: index of the position
$Pmax_i$: maximum possible position for keyword i
$Pob_{is}$: obtained position at time s for keyword i Algorithm FIG. 4 represents the general scheme of the bid agitation algorithm.

Figure 4:
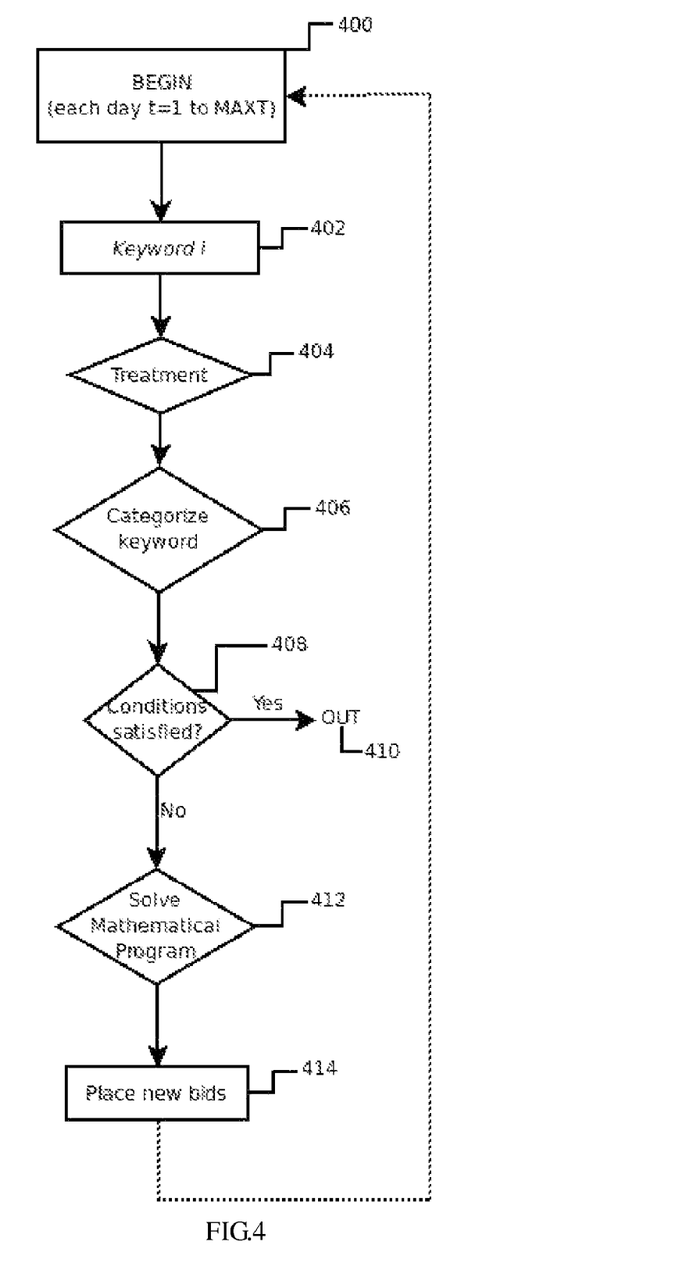
FIG. 4 is the presentation of the agitation algorithm (daily algorithm).

This algorithm is a daily algorithm (step 400 of FIG. 4). All the keywords which are agitated at day t go through this algorithm (step 402 of FIG. 4).

The step 404 of FIG. 4 indicates that the keywords are pretreated before being agitated.

This pretreatment consists of several steps:
- weighing clicks or conversions according to the number of impressions per day of week,
- performing the linear and exponential regressions,
- verifying the economical hypotheses,
- choosing the best prediction curves for each required prediction,
- calculating $L_i$ and $U_i$, weighing each data point and calculating the density of each interval.

The step 406 of FIG. 4 indicates that the keyword i is categorized in the group number 1, 2 or 3 according to the results of its pretreatment.

The step 408 of FIG. 4 verifies whether the exit conditions of the algorithm are satisfied for keyword i. The exit conditions (step 410 of FIG. 4) of the algorithm are as follows:
- the prediction curves verify the economical hypotheses and the accuracy conditions;
- the granted time for agitation is finished.

If the keyword continues to be agitated, then the program solves the associated mathematical program (see next section), this is done in step 412 of FIG. 4.

Then, based on the results of the mathematical program, new bids are placed (step 414 of FIG. 4).

Linear Program

The model for optimizing the agitation consists of the resolution of a linear program with binary variables. In the linear program, there is one binary variable per agitated keyword and per possible position on the search engine (the maximal position, $Pmax_i$, is determined by the following formula: min (maximal position determined by the prediction curves, 30)).

The objective function tries to minimize the absolute value of the difference between the daily agitation budget and the predicted cost.

The constraints are the following:
- There is one constraint per keyword making sure that the keyword occupies a single position on the search engine.
- There are constraints to force a keyword to visit positions it had not yet visited (i.e. out of $[L_i, U_i]$).
- From day t=2, there are constraints to prevent visiting positions already visited during the agitation period $Pob_{is}$.
- There are also optional constraints to permit visiting less dense regions of $[L_i, U_i]$. In this case, the weight given to each historical data point depends on the time s when the data occurred, and of the cyclicity of the keyword.

The open-source solver Cbc (from Coin-OR library http://www.coin-or.org/) is used to solve the linear program. Nevertheless, if the resolution time becomes too long for some campaigns, there is a possibility to use in the future a heuristic method such as tabu search.

The model described above is suited for keywords which have been in the system for at least a week.

The model for the agitation of new keywords is a little different. For the first few days, there are several possibilities. The first one is that account managers set bids for the first day, and then change them each day for at least day 2 and 3. The system will then begin to automatically change the bids (3 data points are sufficient to produce the first prediction curve).

The second one is that account managers set the bids for the first day only. The system will then change the bid up and down (in an equilibrated way) for days 2 and 3. Then, the system will automatically change the bids. The third possibility is that the system uses the Google Traffic estimator to place the bids for the first day. Then for the following days, the system works the same way as in possibility number 2.

Optimization of a Portfolio of Keywords

Keywords going directly through optimization are collected in step 120 of FIG. 1 (group A). Keywords having no usable historical data are gathered and predicted in a global way and are also optimized with this method (groups B to F).

The following are the notations necessary for understanding the mathematical model. Following that, the main idea of the mathematical model will be presented.

Notations

The variables are the following:

$x_{ip}$: binary variable for keyword i in position p. If $x_{ip}=1$ that means that the keyword i is in position p.

$DB_{jc}$: variable for determining the optimal budget for campaign c on search engine j.

Other notations:

DB: total daily budget.

Linear Program

Objective Function

There are several possible objective functions according to the desires of the user:

Maximize conversions

Maximize revenue

Maximize ROAS

Maximize clicks

. . .

The model to optimize the keywords going to the optimization step is as follows.

There is a binary variable per keyword and per possible position on the search engine (the maximum position is determined by the following formula: min(maximum position determined by the prediction curves, 30)). The problem is formulated as a multiple-choice binary knapsack with additional constraints.

This problem is solved by the open-source solver Cbc (from the Coin-OR library http://www.coin-or.org/). Nevertheless, if the resolution time becomes too long for some portfolios, there is a possibility for future user of a heuristic method such as tabu search.

Constraints

There are several types of constraints:

The first type of constraint ensures that a keyword occupies at most one position (if for a keyword i, $x_{ip}=0$ $\forall p$, then the keyword receives a maxCPC of $0 for the next day— equivalent to pause).

The second type of constraint ensures that the costs for the campaigns c on a search engine j are less or equal to the attributed budget $Db_{cj}$.

The third type of constraint ensures that the total budget is respected (that means that the sum of the $Db_{cj}$ is less or equal to DB).

The fourth type of constraint ensures that the variables $x_{ip}$ are binary.

The fifth type of constraint indicates that the variables $Db_{cj}$ are non negative.

General Schemes

Figure 5:
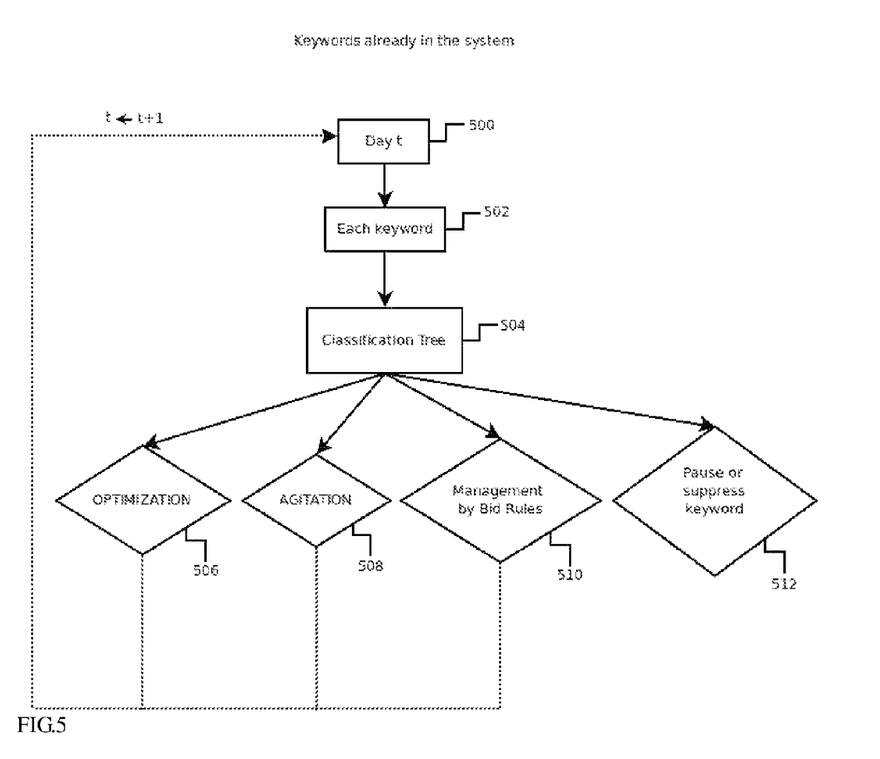
FIG. 5 is the general scheme of the process for existing campaigns.
Figure 6:
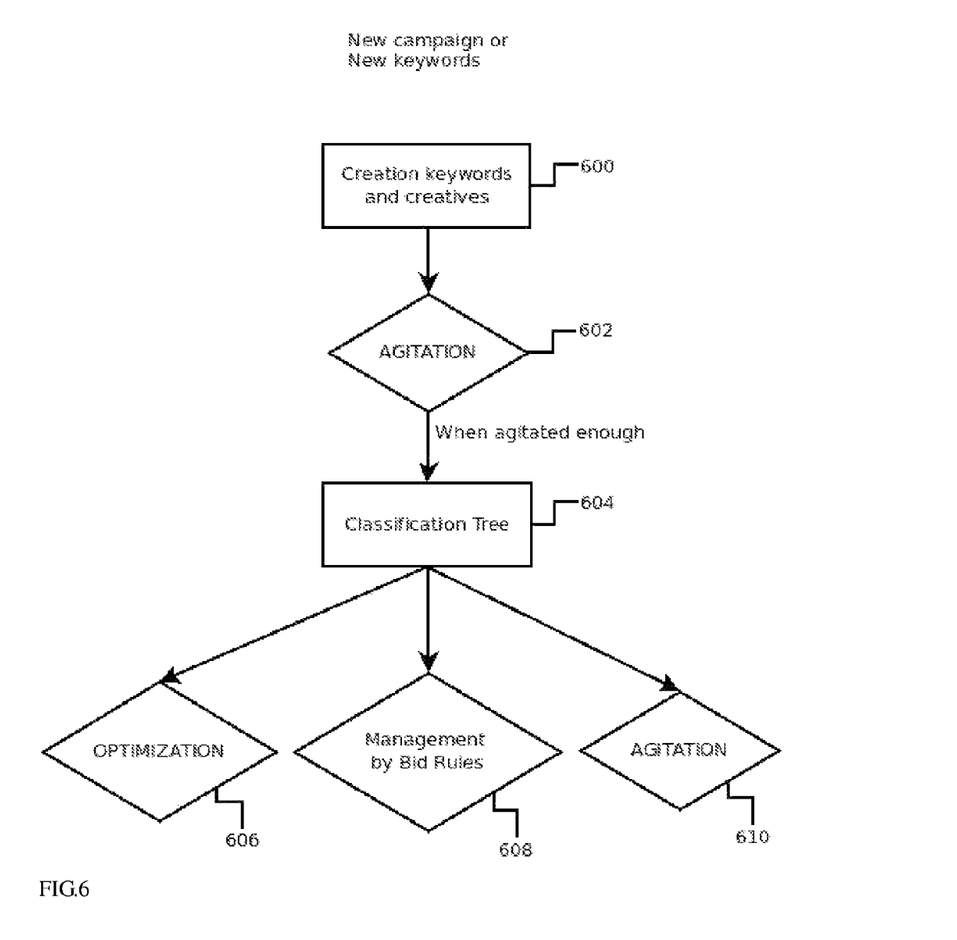
FIG. 6 is the general scheme of the process for new keywords.

FIG. 1 represents the classification tree. The general scheme of this tool is represented by two flowcharts: FIG. 5 and FIG. 6.

FIG. 5 represents the general scheme for existing campaigns and keywords. Every day (step 500 of FIG. 5), each keyword (step 502 of FIG. 5) goes through the classification tree (step 504 of FIG. 5) and according to where it ends it is either optimized (step 506 of FIG. 5), agitated (step 508 of FIG. 5), managed by rules (step 510 of FIG. 5) or proposed to be paused or suppressed (the user has the option to approve or disapprove suggested pausing or removal of keywords) (step 512 of FIG. 5).

FIG. 6 represents the general scheme for new keywords or new campaigns. The keywords, creative, destination URL, etc., are first created (step 600 of FIG. 6) then, the keywords are directly sent to agitation (step 602 of FIG. 6). Once they are sufficiently agitated, they go through the normal scheme of FIG. 5 and are sent to the classification tree (step 604 of FIG. 6. Then, according to their results in the classification tree, they are either optimized (step 606 of FIG. 6), managed by rules (step 608 of FIG. 6) or agitated (step 610 of FIG. 6).

Multichannel Advertisements

In the system, there is an option that takes into account other sources of advertising such as banners, emails, etc. When this option is activated, both the portfolio optimization model and the agitation model take into account these multi-channels advertisements.

Hardware Description

Figure 8:
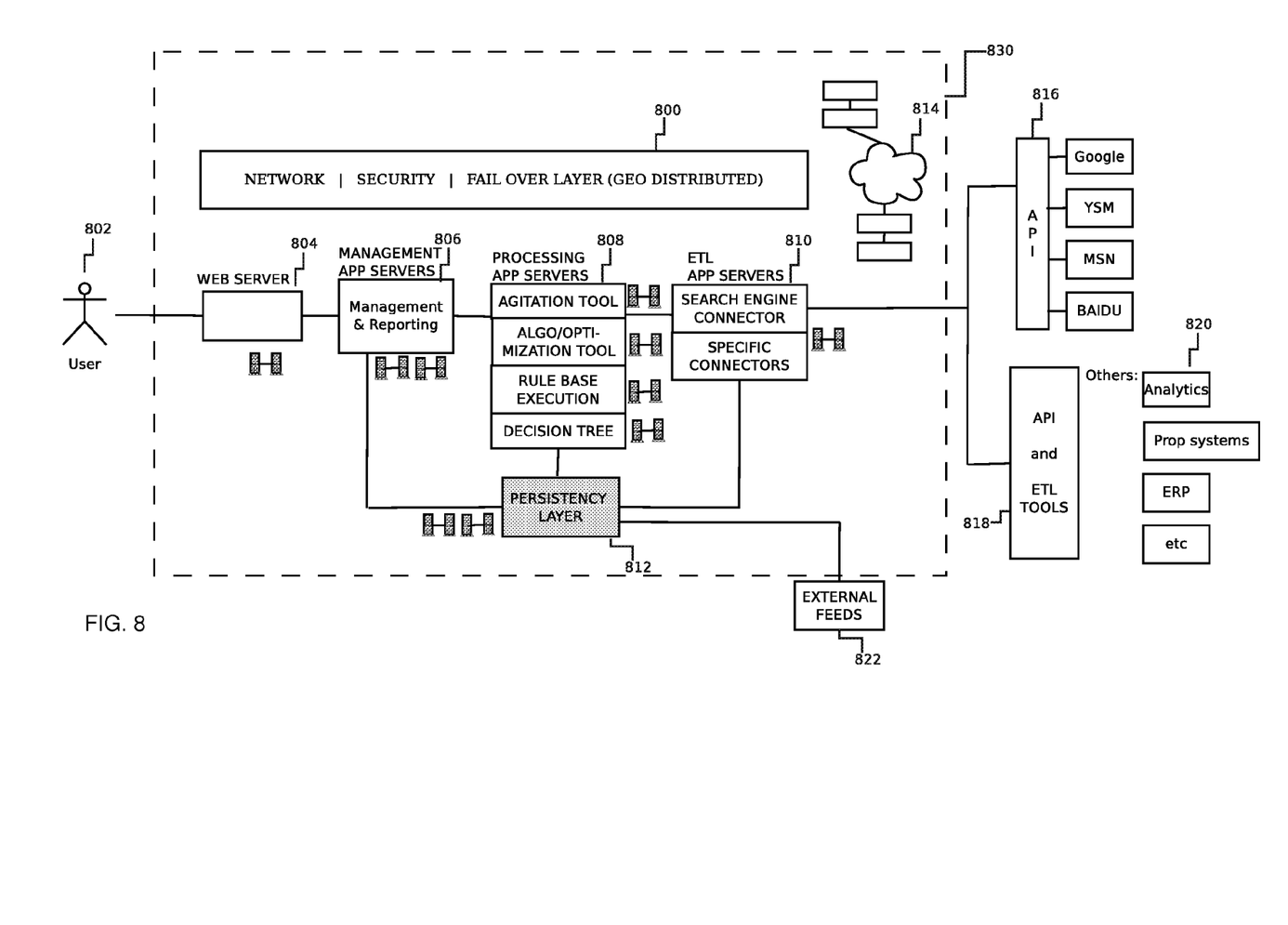
FIG. 8 presents the hardware which supports our system.

FIG. 8 Presents the hardware which supports our system. In fact, step 830 of FIG. 8 the global system of our invention. When a user makes a request (802 of FIG. 8), this one goes through a web server (804) to enter the system.

FIG. 8 Is the conceptual process model which can be executed on one or many physical servers per category of process and enables the capability to use grid computing to further improve the scalability of our invention.

Figure 9:
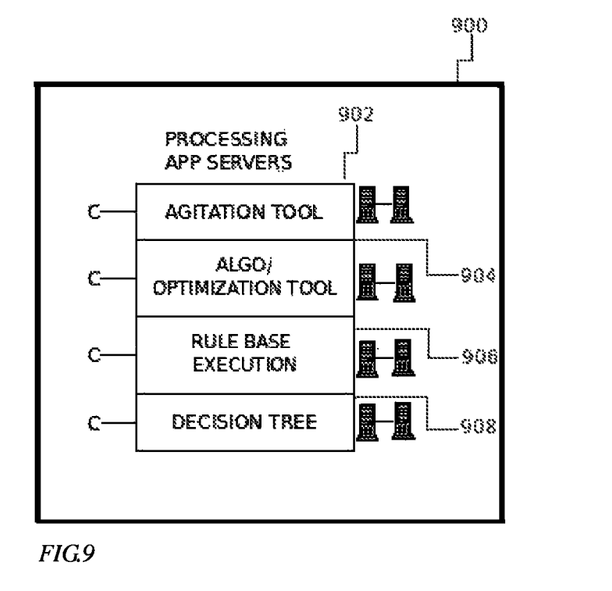
FIG. 9 presents the processing app servers.

FIG. 9 Demonstrates that the optimization process leverages a single or a multi servers infrastructure to provide the fastest response time.

FIG. 9 Demonstrates the agitation process automatically chooses keywords that must be agitated to further improve the optimization process by improving the quality of the prediction model. The agitation support multiple parameters toward which it must agitates the portfolio's elements and it is highly scalable by supporting a single or multiple agitation process in parallel to improve the response time of the implementation.

FIG. 9 Demonstrates the integration between each components associated with managing the optimization process. Its integration enables a greater cost reduction by enabling to automatically detects and improves elements in the campaigns that will improve the prediction model.

Figure 10:
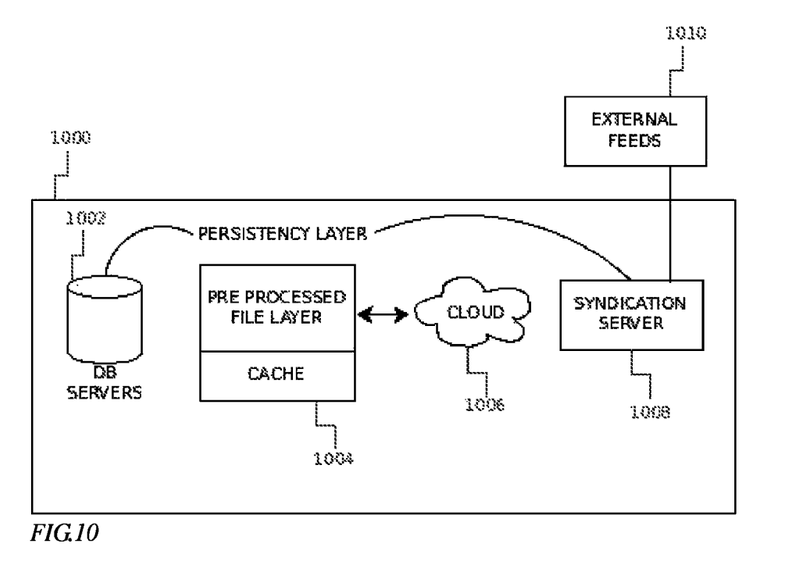
FIG. 10 presents the persistency layer.

FIG. 10 (step 1010) Represents a generic process which will enable to process qualitative and quantitative external data that must be captured and uses as criteria in the optimisation/agitation process.

The optimization goals, constraints and other settings are supported by the management application servers (806). Those servers are also used to visualize the optimization results and to produce reports.

The processing application servers (808) represent the innovative tools of our system: the agitation tools, the optimization tool, the rule base execution tool, the decision tree. The processing app servers are described in details in FIG. 9.

The Extract Transform and Load (ETL) application servers (810) are the search engine connectors or the specific connectors.

The persistency layer (812) is described in details in FIG. 10.

The step 814 represents the fact that our system can run on a cloud (814) or on physical machines.

The system connects to the APIs of the search engines (816) as Google, MSN, Yahoo, Baidu for example. The system also connects to the APIs and ETL tools (818) of other systems (820) such as Analytics, proprietary systems, ERP, for example.

FIG. 9 represents the processing application servers (900). 902 is the automatic agitation tool. 904 is the automatic optimization tool. 906 is the rule base execution tool. 908 is the decision tree. The C on the drawing represents the cartridge specific implementation supports. Cartridges represent a specific implementation of the components (902, 904, 906, 908). Each cartridge consists of a single implementation that meet the specific aspects of an industry and/or the distinctive optimization approach of an agency. Each cartridge can be executed on some hardware or in the cloud. The cloud delivery model involves the provision of dynamically scalable and virtualized resources as a service over the Internet. The 4 specific components (902, 904, 906, 908) can be executed in the cloud through an on-demand instantiation of the resources required to perform the task.

FIG. 10 represents the persistency layer (1000). The persistence layer is composed of different components that have the responsibility to store and access the data requires by the processing application servers and by the management application servers. Some strategies are implemented in order to optimize the processing time required by each optimization cycle. As an example, if an optimization needs the last 90 days of stats data, the persistence layer will store in a cache the last 89 days of data and append the previous day of data to the set of the last 90 days. The storage can be done in the clouds as flat files or on a set of active database servers.

Conversions Attribution

Moreover, the model of conversion attribution can be set. In the basic setting, the conversion is attributed to the last click. The other models take into account all the clicks having contributed to a conversion. The models optimize the weight given to each click contributing to a conversion (and with taking into account all channels of advertisements) according to different predetermined scenarios.

In the advanced options, the model takes into account all the advertisements channels (PPC, banners, emails, etc.) and optimizes the weight given to each action contributing to a conversion (even if this action is not a click, but for example, a view).

Figure 7:
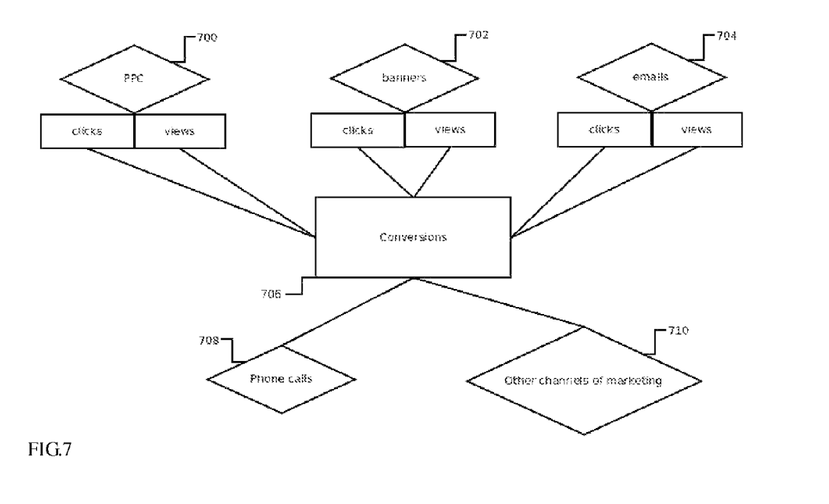
FIG. 7 presents a general view of the different channels of marketing which can contribute to a click.

FIG. 7 represents a general view of the marketing channels which can contribute to a conversion (step 706 of FIG. 7): Clicks or views on PPC ads (step 700 of FIG. 7), clicks or views on banners (step 702 of FIG. 7), clicks or views on email ads (step 704 of FIG. 7), phone calls (step 708 of FIG. 7) and other channels of marketing, such as social networks (step 710 of FIG. 7).

Machine Learning

Also, machine learning techniques are added to the agitation tool and the portfolio optimization tool so that the models can learn from past decisions to improve future ones.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for managing advertising campaigns on at least one communication network, the method comprising the steps to:

allow the creation of portfolios of one or more keywords across at least one advertising campaign and at least one search engine;

fetch historical data relating the plurality of keywords;

fetch campaign specifications and data relating the at least one advertising campaign;

classify the plurality of keywords in the portfolios according to the historical data using a decision tree;

calculate at least one prediction curve for the plurality of keywords;

optimize the portfolios of the plurality of keywords by automatically determining a bid amount for at least one of said plurality of keywords and by restraining the bid amount determination, wherein the total amount of bid amounts is under the at least one advertising campaigns budget;

communicate the determined bid amount across a computer network.

2. A method for managing advertising campaigns as described in claim 1, wherein the steps further comprise steps to:

agitate the plurality of keywords having held a stagnant position during a pre-determined time period;

input at least one new keyword;

agitate the at least one new keyword;

communicate the determined the new keywords across a computer network.

3. A method for managing advertising campaigns as described in claim 2, wherein the steps further comprise a step for classifying the plurality of keywords in the portfolios.

4. A method for managing advertising campaigns as described in claim 3, wherein the classification of the plurality of keywords in the portfolios uses a decision tree.

5. A method for managing advertising campaigns as described in claim 3, wherein the classification of the plurality of keywords in portfolios uses bids agitation.

6. A method for managing advertising campaigns as described in claim 3, wherein the classification of the plurality of keywords in the portfolios further comprise the use of modelling of mathematical problem as a multiple-choice binary knapsack having additional constraints.

7. A method for managing advertising campaigns as described in claim 1, wherein the automatic determination of bid amounts comprises the use of a bid rules management engine.

8. A method for managing advertising campaigns as described in claim 1, wherein the method further comprise a step to visualize at least one prediction curve.

9. A method for managing advertising campaigns as described in claim 1, wherein the method further comprise any of the following steps:

selecting the plurality of keywords of the portfolios;

preparing visual reports presenting the plurality of keywords performances;

setting at least one objective to be achieved by the optimization of the portfolios;

setting at least one constraint applying to the optimization of the portfolios.

10. A method for managing advertising campaigns as described in claim 1, wherein the step to optimize the portfolios comprises optimizing each one of the portfolios separately.

11. A method for managing advertising campaigns as described in claim 4, further comprising a step to classify the keywords using a decision tree, wherein the classification is executed at a predetermined frequency.

12. A method for managing advertising campaigns as described in claim 11, wherein the decision tree comprises the following decisions:
   definition of a threshold value x below which the number of historical data is not acceptable;
   definition of a value T representing the number of days of the reference period;
   verification that each keyword obtained more than x days of historical data within the reference period T;
   definition of a threshold value C1 below which the number of clicks is not acceptable;
   verification that each keyword obtained a number of clicks higher or equal to the predetermined number of at least C1 clicks during the reference period T;
   calculation of at least one regression, wherein the at least one regression allows the prediction of at least one metric data;
   verification that the predictions obtained by calculating of the at least one regression are acceptable, wherein a prediction is acceptable if at least all the following tests are verified:
      the number of predicted clicks in position 1 is higher than 0;
      the obtained position of a CPC valued to $0 is higher or equal to 1;
      the derivative of the curves positions-clicks or positions-conversions is lower than 0;
      the derivative of both curves positions-maxCPC and positions-averageCPC are lower than 0;
   calculation of the determination coefficient ($R^2$) of the regressions;
   definition of a threshold value z below which $R^2$ is not acceptable;
   verification that $R^2$ of the regressions is at least greater than the value z ;
   calculation of p-value of the at least one regression;
   definition of a threshold value w below which the p-value is not acceptable;
   verification that the p-value of the regressions is lower than the value w;
   definition of a threshold value minQS below which a quality score of the keywords having less than x days of historical is not acceptable, wherein the quality score is calculated by a search engine;
   definition of a threshold value minCTR below which the click-thru-rate of the keywords having less than x days of historical is not acceptable;
   verification that the quality score is higher than minQS and that the click-thru-rate is higher than minCTR for keywords having less than x days of historical;
   calculation of the difference between the bid maxCPC and the first page bid;
   verification that the difference between the maxCPC and the first page bid is higher than 0;
   definition of a value pos determining the minimum number of different positions a keyword must have visited;
   verification that a keyword has visited a number of different positions greater than the value pos.

13. A method for managing advertising campaigns as described in claim 2, wherein the step to agitate stagnant keywords is automatic and forces the keywords to be applied to a plurality of positions of at least one search.

14. A method for managing advertising networks as described in claim 1, wherein the step to optimize the portfolios is automatic and wherein the optimization step adjusts the bid amount of the plurality of keywords based on the calculation of the prediction curve.

15. A method for managing advertising campaigns as described in claim 14, wherein the step to optimize the portfolios further comprise at least one constraint to restrain the budget of each advertising campaign and of all the advertising campaigns such that the budget is inferior to a predetermined value.

16. A system for managing advertising campaigns over at least one communication network comprising:
   at least one communication network;
   at least one application server configured to:
      i) create at least one portfolio containing at least one keyword;
      ii) fetch historical data of the at least one keyword;
      iii) classify the at least one keyword using a classification tree;
      iv) produce at least one prediction curve for the at least one keyword;
      v) optimize the bidding of the at least one keyword;
      vi) input at least one new keyword;
      vii);
      viii) manage the bidding using rules;
      ix) communicate the new bids amounts across the computer network;
   at least one data storing device having at least one datas source.

17. A system for managing advertising campaigns as described in claim 16, wherein the at least one application server is configured to agitate at least one keyword present in at least one advertising campaign.

18. A system for managing advertising campaigns as described in claim 16, wherein the at least one application server comprises a specific implementation adaptable to a specific advertising network.

19. A system for managing advertising campaigns as described in claim 16, wherein the at least one application server is hosted at a remote location.

20. A system for managing advertising campaigns as described in claim 16, wherein the at least one application server communicates with at least one search engine to retrieve information.

21. A system for managing advertising campaigns as described in claim 16, wherein the at least one application server communicates with at least one social platform to retrieve information.

22. A system for managing advertising campaigns as described in claim 16, wherein the at least one application server communicates with at least one display advertising network to retrieve information.

23. A system for managing advertising campaigns as described in claim 16, wherein the at least one application server communicates with a third party system.

24. A system for managing advertising campaigns as described in claim 16, wherein the system comprises more than one application server, wherein each of the at least one application server is configured to act as a processing application server or as a management application server.

25. A system for managing advertising campaigns as described in claim 24, wherein the system is configured to store and access data required by the processing application server and by the management application server through the use of a plurality of components.

* * * * *